No. 830,384. PATENTED SEPT. 4, 1906.
W. T. URIE.
MOTOR CAR.
APPLICATION FILED APR. 2, 1906.

5 SHEETS—SHEET 1.

Witnesses
Inventor
W. T. Urie
P. T. Dodge
Attorney

No. 830,384. PATENTED SEPT. 4, 1906.
W. T. URIE.
MOTOR CAR.
APPLICATION FILED APR. 2, 1906.

5 SHEETS—SHEET 4.

No. 830,384. PATENTED SEPT. 4, 1906.
W. T. URIE.
MOTOR CAR.
APPLICATION FILED APR. 2, 1906.
5 SHEETS—SHEET 5.
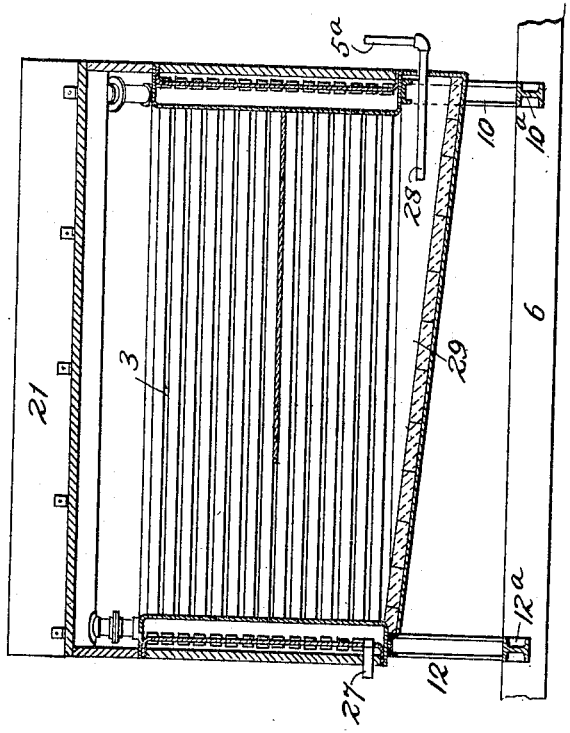
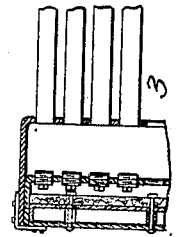
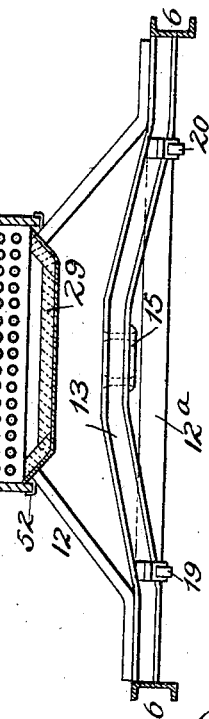
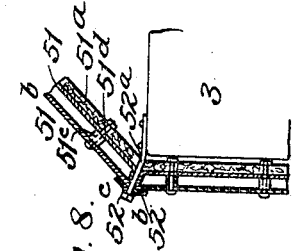

UNITED STATES PATENT OFFICE.

WILLIAM T. URIE, OF KANSAS CITY, MISSOURI.

MOTOR-CAR.

No. 830,384.    Specification of Letters Patent.    Patented Sept. 4, 1906.

Application filed April 2, 1906. Serial No. 309,522.

*To all whom it may concern:*

Be it known that I, WILLIAM T. URIE, of Kansas City, county of Jackson, and State of Missouri, have invented a new and useful Improvement in Motor-Cars, of which the following is a specification.

The object of this invention is to produce a steam-propelled passenger-car for use either on street or suburban railway or other lines connecting distant points, in which car the boiler, water-tank, engines, and appurtenant mechanism will be disposed in compact arrangement and sustained over the forward truck and which parts will be of such form and construction as to produce the maximum driving power and the most advantageous application of the same for the amount of fuel consumed.

The invention is directed to the manner of arranging the boiler, water-tank, and fuel-tank in compact form, so as to occupy little space in the front portion of the car and so that the weight of these parts will be disposed directly over and sustained by the forward truck in order to increase the traction of the wheels, to the specific manner of mounting the engines on the truck, to the form of the truck, to the manner of gearing the engines to the drive-wheels to secure the greatest driving efficiency, to the manner of firmly sustaining the boiler in the car-body, and to various other details of construction which will be fully described in the specification and their novel features pointed out in the claims.

Figures 1, 2:
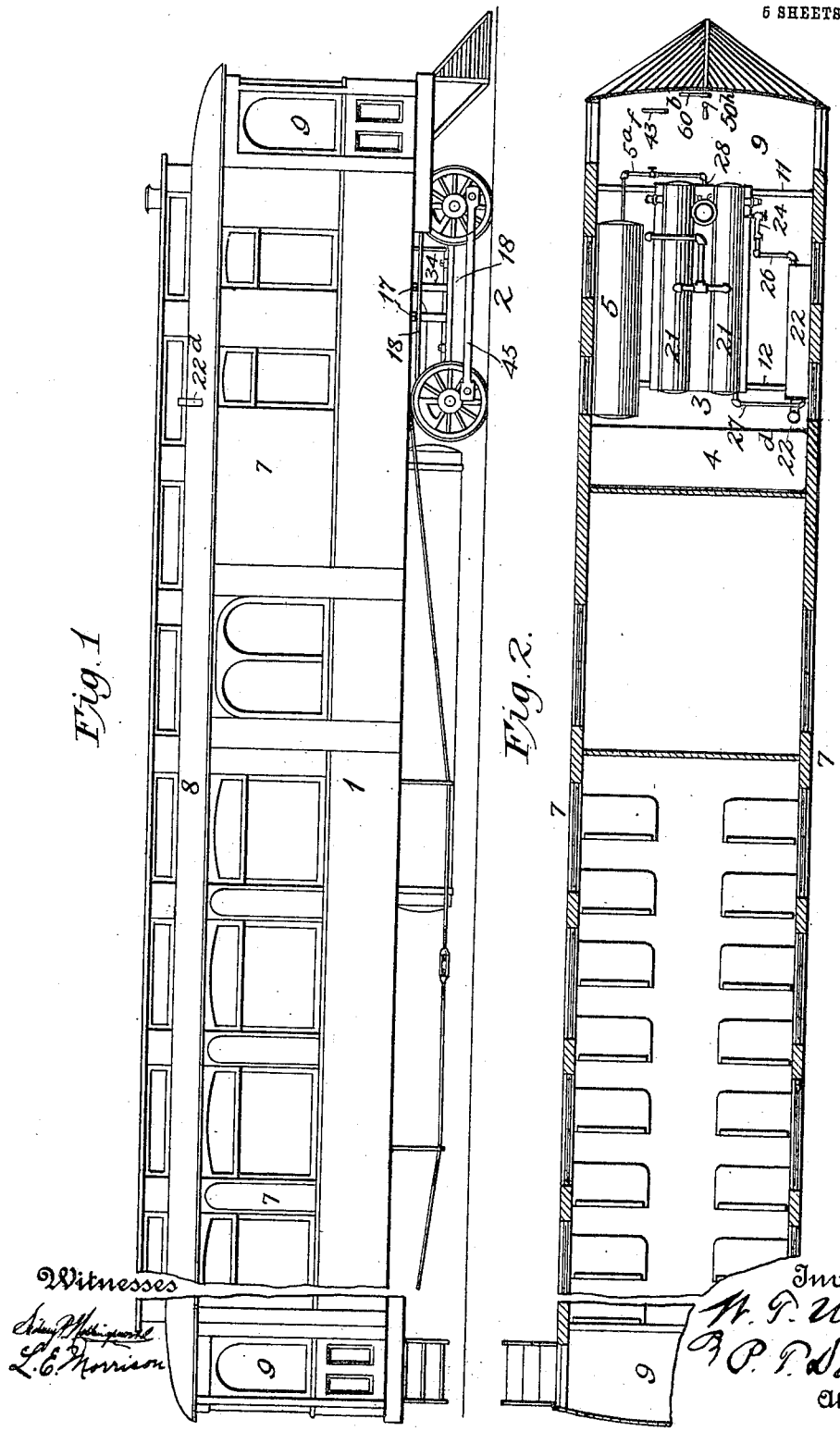
Figure 3:
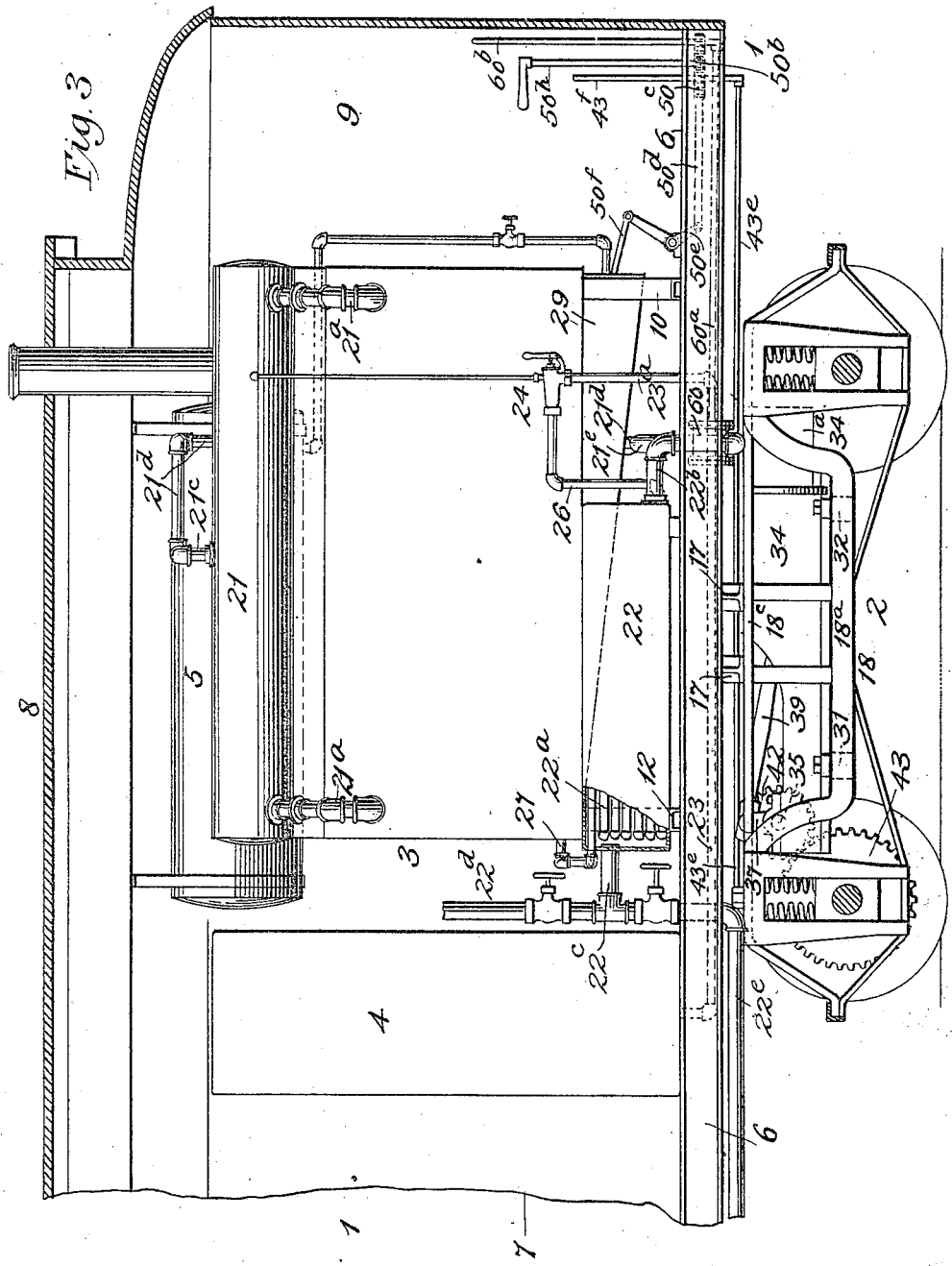
Figure 4:
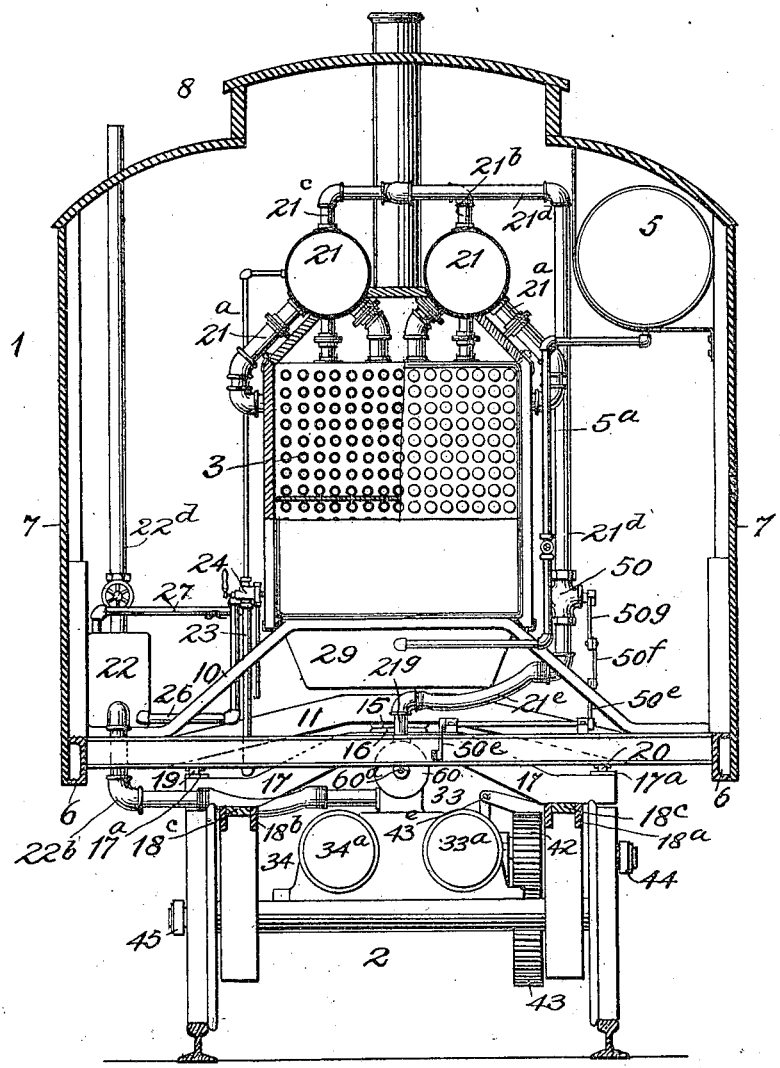
Figure 5:
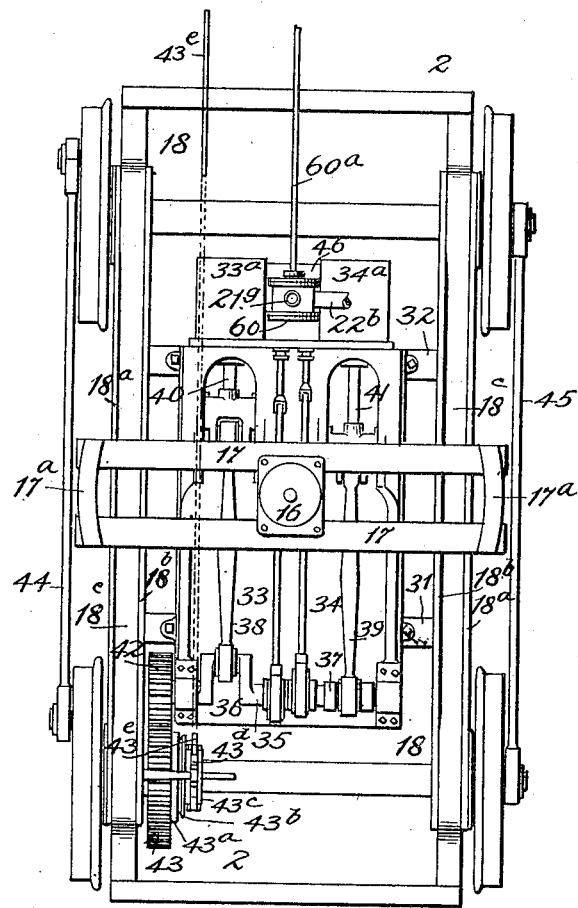
Figure 5A:
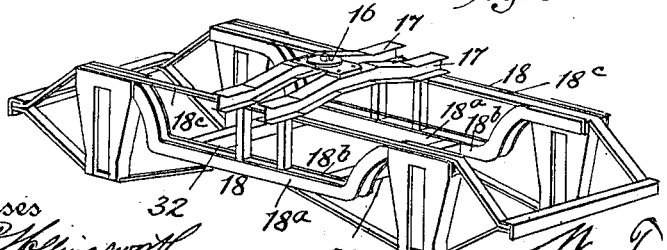

In the accompanying drawings, Figure 1 is a side elevation of a passenger-car equipped with my improved driving mechanism. Fig. 2 is a top plan view of the same with the roof of the car removed at its front to show the relative arrangement of the boiler, water-tank, and oil-tank. Fig. 3 is a vertical longitudinal sectional elevation, on an enlarged scale, of the forward portion of the car. Fig. 4 is a vertical transverse sectional elevation of the same. Fig. 5 is a top plan view of the forward truck and the engines mounted thereon. Fig. 5$^a$ is a perspective view of the truck with the engines removed. Fig. 6 is a transverse sectional elevation of the boiler, showing how it is sustained in the car-body. Fig. 7 is a longitudinal sectional elevation of the same. Figs. 8 and 9 are sectional elevations of details.

Referring to the drawings, 1 represents the car-body sustained by the forward truck 2 and a rear truck, (not shown,) which body is formed at its front and over the forward truck to receive a boiler 3, a water-tank 4, a fuel-tank 5, and appurtenant parts and constructed in rear of these parts for the accommodation of passengers or the load to be carried. The body of the car comprises the usual longitudinal sills 6, sides 7, and roof 8, and for passenger service the ends of the body may be equipped with the usual vestibules 9.

The boiler is rectangular in cross-section, of the tubular-flue type, and it is arranged centrally in the front part of the car-body. It is sustained at the front and rear by two transverse arched supporting-bars 10 and 12, rising from and fastened at their ends to two horizontal transverse beams 10$^a$ and 12$^a$, secured in turn to the longitudinal sill 6. Connecting the two longitudinal sills at a point beneath the boiler are two transverse arched sills 11 and 13, extending parallel to each other, which sills by being arched adapt the car-body to set low on the truck 2, to which the body is swiveled by means of a vertical connecting pin or bolt adapted to be passed through a wear-plate 15, sustained by the transverse sills, and through an underlying wear-plate 16 on the forward truck. The wear-plate 16 is applied to the upper sides of two arched transverse bars 17, having their outer ends sustained by the side frames 18 of the truck, as will be more fully described hereinafter, traction-rollers 19 and 20, mounted on the under side of the transverse sills 11 and 13, being adapted to travel on longitudinal plates 17$^a$, fixed to the ends of the bars 17 to ease the relative movements of the body and truck.

The boiler is surmounted by two longitudinal cylindrical chambers or drums 21, communicating with the water-space by a number of pipes 21$^a$—in the present instance six—entering the water-space at the top and sides. The steam is taken from the upper part of these chambers by two pipes 21$^b$ and 21$^c$, entering the top of the chambers and communicating with a pipe 21$^d$, which extends downwardly along the side of the boiler to the under side of the same, where it connects with a flexible hose or pipe 21$^e$, extending transversely beneath the boiler to the center of the car-body, at which point it is connected with the upper end of a vertical fixed pipe 21$^g$, carried by the truck and supplying steam to the engines, as will be presently described.

The water is supplied to the boiler from the water-tank 4, before alluded to, which is rectangular in form and occupies the space in rear of the boiler. The tank stands in an upright position, extending nearly the full height of the car-body and entirely across the same from side to side, completely filling and utilizing the transverse space immediately in rear of the boiler and the oil-tank. Before entering the boiler the water is heated in a water-heater 22 in the form of a longitudinal chamber or casing at the base of the car-body at the side of the boiler, which casing contains a coil of pipe $22^a$, through which the water is forced in its passage to the boiler, and which coil is heated by the exhaust-steam entering the front end of the casing through the pipe $22^b$ and leaving the same at the opposite end through pipe $22^c$, which latter connects with branch pipes $22^d$ and $22^e$, the former leading upwardly through the roof of the car and the latter downward in order to convey the exhaust-steam to the rear portion of the car for heating purposes. The water for the boiler is led from the under side of the tank 4 through pipe 23, extending horizontally forward to the front of the boiler, where it connects with a vertical pipe $23^a$, leading to an injector 24, supplied with steam from a vertical pipe leading to one of the horizontal drums 21. The injected water passes by pipe 26 to the forward end of the coil $22^a$ in chamber 22, and leaving said coil at the opposite end of the chamber it enters the rear end of the boiler by pipe 27.

I propose to employ oil as the fuel for heating the water and to spray the same in the flue-space through a pipe 28 entering the front at the base of the flue-space. The oil is stored in the tank 5, before alluded to, which is cylindrical in form and arranged longitudinally in the upper part of the car just beneath the roof at the side of chamber 21. From this tank the oil flows through vertical pipe $5^a$ to the horizontal spray-pipe 28, from which it issues in spray above an upwardly-inclined fire-brick floor 29, forming the bottom of the flue-space. The products of combustion pass around the flues, as usual, and issue from the front through the roof of the car.

Referring to Figs. 5 and $5^a$, which illustrate the construction of the truck 2 and the manner of mounting the engines thereon, it will be seen that the two side frames 18, above referred to, are each constructed of two parallel longitudinal bars $18^a$ and $18^b$, bent upwardly at their ends and having fixed to these upwardly-bent ends a longitudinal horizontally-extending sustaining-bar $18^c$, on which the ends of the two transverse arched bars 17, before alluded to, are seated and firmly secured. The depressed intermediate portions of the two sets of parallel bars $18^a$ and $18^b$ are connected together and sustained in fixed relations by two transversely-extending supporting-beams 31 and 32, which afford a support for two engines 33 and 34. The beds of these engines are firmly and fixedly bolted to the transverse beams 31 and 32, and at their front ends they have fixed to them cylinders $33^a$ and $34^a$, while at their opposite ends they are provided with bearings in which is mounted a transverse driving-shaft 35, provided with two cranks 36 and 37, to which are connected the rear ends of connecting-rods 38 and 39, having their opposite ends connected with piston-rods 40 and 41, connected with the pistons in the cylinders. At one end the crank-shaft is provided with a small pinion 42, meshing with a larger pinion 43, clutched to the rear axle, by which means this axle is driven by the engines, and its motion is imparted to the front axle through the medium of connecting-rods 44 and 45. The cylinders of the engines communicate with a valve-chest 46, equipped with valves operated by eccentric mechanism actuated from the crank-shaft, and steam is supplied to the valve-chest by the vertical pipe $21^g$, before alluded to. The exhaust from the cylinders passes by pipe $22^b$ to the heating-chamber 22, before alluded to.

The steam-pipe $21^d$, by which the live steam passes to the engines, is provided with a throttle-valve 50, as shown in Fig. 4, which is operated from the front of the car by means of a vertical rock-shaft $50^h$, having at its upper end a horizontal handle and having at its lower end a pinion $50^b$, engaging a rack $50^c$ on the forward end of a horizontal longitudinally-extending rod $50^d$. The rear end of the rod is jointed to an elbow-lever $50^e$, pivoted to the floor of the car and connected, by means of a link $50^f$, with an arm $50^g$ on the throttle-valve. In order to prevent the radiation of heat from the boiler, it is inclosed in a housing or casing comprising a sheet of asbestos and a sheet of iron separated by an intermediate air-space, which housing is made detachable to admit access to the boiler. The construction of the housing and its arrangement is shown in Figs. 8 and 9, where it will be seen that it extends upwardly at the sides of the boiler, then diagonally above the same to the two drums 21, and between these drums. The housing consists of an inner metal sheet 51, having a sheet of asbestos $51^a$ fixed to it and arranged next the boiler, and an outer metal sheet $51^b$, separated from the other sheet by spacing-spools $51^c$, through which fastening-bolts $51^d$ extend and act to fasten the parts together and in fixed relations. At the lower edges the housing is seated on lugs 52, fastened to the boiler, while at the upper corners of the boiler it is held detachably in place by rods $52^a$, extending outwardly from the boiler through the housing and provided with cap-plates $52^b$, confined on the rods and against the outer surface of the housing by nuts 52ᶜ. The edges of the housing are connected with the sides of the longitudinal drums 21 by angle-plates 53, fixed to the drum, and fastening-bolts 53ᵃ, extending through the plates and housing. The end heads of the boiler are covered by a similar housing, fastened detachably within the annular end flanges, as shown in Fig. 9.

In order that when descending grades the driving mechanism may be disengaged from the driving-axle and the latter allowed to run free, I propose to provide a friction-clutch, by means of which the large driving-pinion 43 may be frictionally engaged with the driving-axle or disengaged therefrom. This construction is illustrated in Fig. 10, where it will be seen that the pinion 43 is loose on the axle and formed with a friction-flange 43ᵃ, adapted to be engaged by a friction-wheel 43ᵇ, splined to the axle and adapted by its endwise movements thereon to engage and disengage the friction-flange. The wheel is formed with a sleeve 43ᶜ, having an annular groove in which engages an actuating-fork 43ᵈ on the rear end of a longitudinal horizontal rock-shaft 43ᵉ, extending forwardly and terminating at the front platform. At this point the shaft is provided with an upwardly-extending operating-lever 43ᶠ, by means of which the attendant may clutch the driving-pinion to the axle to propel the car or may disengage the same in order to allow the axle to run free.

In order that the engines may be reversed at will, I employ a reversing-valve 60, coöperating with the valve-chests and operated by a longitudinally-extending rock-shaft 60ᵃ, terminating at the front platform, where it is provided with a vertical hand-lever 60ᵇ. The attendant by the manipulation of this lever may control the lead of the steam to the valve-chests and in this way govern the direction of rotation of the crank-shaft.

Having thus described my invention, what I claim is—

1. In combination with a car-body, front and rear sustaining-trucks for the same, a horizontal boiler situated in the forward part of the car and sustained wholly by the floor-framing thereof and directly over the forward truck with the bottom of the boiler above the floor of the car, a horizontal longitudinally-extending engine mounted on the truck beneath the floor of the car, and a steam-pipe leading from the steam-space of the boiler vertically downward alongside the boiler and extending laterally beneath the same, and thence downward through the floor of the car and connecting with the engine.

2. In combination with the car-body, a horizontal boiler therein sustained by the floor-framing of the same, a vertical transversely-extending water-tank situated in the car in rear of the boiler, a water-heater casing extending longitudinally at the side of the boiler at the bottom of the car, a water-coil in the casing, a truck sustaining the car-body at the front directly beneath the boiler, horizontal longitudinally-extending engines mounted on the truck, valve-chests for the same, a steam-pipe leading from the boiler downward through the floor of the car and connecting with said valve-chests, an exhaust-steam pipe leading from the exhaust-ports of the engines laterally and then extending upward through the floor of the car and connecting with the interior of the water-heater casing, a pipe extending from the water-tank horizontally forward within the car and connecting with the forward end of the water-coil, and a pipe connecting with the opposite end of the water-coil and with the boiler.

3. In combination with the car-body, a horizontal boiler in the forward portion of the same sustained by the floor-framing, a longitudinal oil-tank, sustained in the upper part of the car-body at the side of the boiler, a downwardly-extending pipe connection from the tank for spraying oil into the flue-space of the boiler, a vertical water-tank extending transversely immediately behind the boiler, a truck sustaining the forward portion of the car-body directly beneath the boiler, horizontal longitudinally-extending engines mounted on the truck, a water-heater situated in the bottom of the car-body and at the side of the boiler, a horizontal pipe for conducting water from the tank to the front of the water-heater, a pipe for conveying the heated water from the water-heater to the boiler, a pipe for conducting the exhaust from the engines to said water-heater, said pipe extending laterally beneath the car-body and then upward through the floor and connecting with the water-heater, and a pipe for conducting live steam from the boiler to the engine, said pipe extending downward alongside the boiler and laterally beneath the same and finally downward through the floor of the car and connecting with the engine.

4. In combination with the car-body having the longitudinal sills, transverse beams connected with said sills, transverse arched bars fastened at their ends to and supported by the beams, and a boiler seated on and secured to the arched bars.

5. In combination with the car-body, a boiler situated in the forward portion of the same, a truck swiveled to said body and supporting the same beneath the boiler, engines on the truck, valve-chests for the engines, a vertical pipe leading from the valve-chests and carried by the truck, a transverse flexible pipe extending horizontally beneath the boiler to the side of the same, and a pipe extending vertically from the end of said flexible pipe and entering the steam-space of the boiler.

6. In combination with the car-body, two arched transverse beams on the under side of the same, a truck adapted to support the car-body and having two transverse parallel arched beams rising from the same, a pivotal connection between the arched portions of the bars and beams, longitudinal plates fixed to the upper sides of the arched beams on the truck, and friction-rollers applied to the arch-bars of the car-body and adapted to travel on said longitudinal plates.

7. In combination with a car-body, a boiler situated in the forward portion of the same and sustained by the framing of the car-body, a truck sustaining the forward part of the car-body directly beneath the boiler and swiveled to the car-body, said truck being formed with side frames, transverse beams fastened at their ends to the side frames of the truck, and horizontal longitudinally-extending driving-engines having their beds sustained by and fastened to the transverse beams.

8. In combination with the car-body having a steam-generator in the forward portion of the same, a truck sustaining the forward portion of the said body beneath the steam-generator, said truck having side frames consisting of two longitudinally-extending bars depressed between their ends, transverse horizontal beams sustained by the depressed portions of said longitudinal bars, and driving-engines having their beds attached to and sustained by the transverse bars.

9. In combination with the car-body provided in its forward portion with a steam-generator, transverse arched beams on the under side of the body, a truck having depressed sides frames, longitudinally-extending bars bridging the depressed portions of the side frames, transverse arched beams sustained at their ends by said longitudinal bars, a pivotal connection beween said arched beams and the arched bars on the car-body, transverse horizontal bars connecting the depressed portions of the side frames, and driving-engines sustained by the horizontal connecting-bars.

10. In a motor-car, the combination of a horizontal tubular flue-boiler sustained above the floor of the car, an inclined fire-brick floor forming the bottom of the flue-space of the boiler and situated between the flues and the car-floor, an oil-spray pipe discharging into the flue-space at its front and above the fire-brick floor, and a source of oil-supply connected with the spray-pipe.

In testimony whereof I hereunto set my hand, this 17th day of March, 1906, in the presence of two attesting witnesses.

WILLIAM T. URIE.

Witnesses:
C. W. ALLENDOERFER,
EDWARD H. GREGG.